Patented Aug. 3, 1943

2,325,986

UNITED STATES PATENT OFFICE 2,325,986

POLYMERIC RUBBER COATING COMPOSITION

Robert C. Swain, Riverside, and Pierrepont Adams, Stamford, Conn., assignors to American Cyanamid Company, New York, N. Y., a corporation of Maine No Drawing. Application October 26, 1940, Serial No. 363,004

4 Claims. (Cl. 260—3)

This invention relates to coating compositions containing polymerized rubber and melamine-formaldehyde resins.

An object of this invention is to improve the physical and chemical properties of polymerized rubber compositions, e. g., sensitivity to solvents, reduction in thermoplasticity, hardness, heat resistance, etc.

Another object of this invention is to provide improved melamine-formaldehyde coating compositions.

Still another object of this invention is to provide compositions containing polymerized rubber and compatible proportions of compatible melamine-formaldehyde resins.

These and other objects are attained by blending polymerized rubber, otherwise known as cyclized rubber obtained by reacting the rubber with amphoteric metal halides, with a melamine-formaldehyde resin which has been alkylated with an acyclic alcohol containing from 3 to 8 carbon atoms, wherein the molal ratio of formaldehyde to melamine is at least about 4:1 and wherein the proportion of melamine resin is less than about 40% (total solids weight basis).

The following examples in which the proportions are in parts by weight are given by way of illustration and not in limitation. The polymerized rubber used in the following examples is a product sold under the trade name "Pliolite" by the Goodyear Tire and Rubber Company. The term "polymerized rubber" as used in the following examples is intended to cover only cyclized rubber obtained by reacting the rubber with amphoteric metal halides.

Example 1

| | Parts |
|---|---|
| Melamine-formaldehyde Resin "A" | 10 |
| Polymerized rubber ("Pliolite") | 90 |

A composition containing these ingredients is prepared by admixing 20 parts of melamine-formaldehyde Resin "A" solution (50% resin) with 360 parts of "Polymerized Rubber Stock Solution" (containing 25% of polymerized rubber and 75% of xylene). Films of the composition are applied to metal objects and baked at a temperature of about 135° C. for about one-half hour. The product is a hard, transparent coating having good film strength.

Example 2

| | Parts |
|---|---|
| Melamine-formaldehyde Resin "B" | 25 |
| Polymerized rubber ("Pliolite") | 75 |

A composition containing these ingredients is prepared by admixing 50 parts of melamine-formaldehyde Resin "B" solution (50% resin) with 300 parts of "Polymerized Rubber Stock Solution." Films of the composition are applied to metal objects and baked at a temperature of about 135° C. for about one-half hour. A clear, tough film is formed.

Example 3

| | Parts |
|---|---|
| Melamine-formaldehyde Resin "C" | 10 |
| Polymerized rubber ("Pliolite") | 90 |

A composition containing these ingredients is prepared by admixing 20 parts of melamine-formaldehyde Resin "C" solution (50% resin) with 360 parts of "Polymerized Rubber Stock Solution." Films of the composition are applied to metal objects and baked at a temperature of about 135° C. for about one-half hour. The product formed is a very hard, clear coating.

Example 4

| | Parts |
|---|---|
| Melamine-formaldehyde Resin "D" | 25 |
| Polymerized rubber ("Pliolite") | 75 |

A composition containing these ingredients is prepared by admixing 50 parts of melamine-formaldehyde Resin "D" solution (50% resin) with 300 parts of "Polymerized Rubber Stock Solution." Films of the composition are applied to metal objects and baked at a temperature of about 135° C. for about one-half hour. A water-white film having good chemical properties is formed.

Example 5

| | Parts |
|---|---|
| Melamine-formaldehyde Resin "E" | 10 |
| Polymerized rubber ("Pliolite") | 90 |

A composition containing these ingredients is prepared by admixing 20 parts of melamine-formaldehyde Resin "E" solution (50% resin) with 360 parts of "Polymerized Rubber Stock Solution." Films of the composition are applied to metal objects and baked at a temperature of about 135° C. for about one-half hour. A hard, transparent film is produced.

Example 6

| | Parts |
|---|---|
| Melamine-formaldehyde Resin "F" | 25 |
| Polymerized rubber ("Pliolite") | 75 |

A composition containing these ingredients is prepared by admixing 50 parts of melamine-formaldehyde Resin "F" solution (50% resin)

with 300 parts of "Polymerized Rubber Stock Solution." Films of the composition are applied to metal objects and baked at a temperature of about 135° C. for about one-half hour, to give a smooth, transparent finish.

Example 7

| | Parts |
|---|---|
| Melamine-formaldehyde Resin "F" | 40 |
| Polymerized rubber ("Pliolite") | 60 |

A composition containing these ingredients is prepared by admixing 80 parts of melamine-formaldehyde Resin "F" solution (50% resin) with 240 parts of "Polymerized Rubber Stock Solution." Films of the composition are applied to metal objects and baked at a temperature of about 135° C. for about one-half hour. The product is a hard, clear coating having good chemical properties.

*Preparation of melamine-formaldehyde Resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde Resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde Resin "C"*

| | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde Resin "D"*

| | Parts |
|---|---|
| Melamine-formaldehyde (molal ratio 1:4) spray-dried powder | 300 |
| n-Propanol | 1200 |
| Methyl acid phosphate | 3 |

The melamine-formaldehyde condensation product is obtained by refluxing melamine and formalin (37% formaldehyde in water) in the molal ratio of 1:4 at a pH of about 7–9 for about 3 hours and then spray-drying.

The spray-dried melamine-formaldehyde powder, propanol and methyl acid phosphate are heated to about 90° C. in 40 minutes and refluxed about 30 minutes. This solution is vacuum concentrated at about 50–60° C. until 767 parts of volatile material are distilled off. The resin solution thus formed contains about 48% solids.

*Preparation of melamine-formaldehyde Resin "E"*

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80–85° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde Resin "F"*

| | Parts |
|---|---|
| Melamine-formaldehyde (molal ratio 1:4) spray-dried powder | 200 |
| 2-ethyl hexanol | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7–9 for about 3 hours and then spray-drying.

The spray-dried melamine-formaldehyde powder, octanol, butanol and methyl acid phosphate are heated to about 100–105° C. in 30 minutes and refluxed about 30 minutes. This solution is vacuum concentrated at about 50–70° C. to form a product containing about 50% solids.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with higher alcohols is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., hydrocarbon solvents such as toluene, the chlorinated solvents such as ethylene dichloride, etc., may be added to the original solutions of polymerized rubber and melamine-formaldehyde resin in order to produce perfectly clear solutions if such solutions are not originally obtained.

While formaldehyde has been used in the previous examples, it will be obvious that the various polymers of formaldehyde, e. g., paraformaldehyde or substances which yield formaldehyde may be used in place of part or all of the formaldehyde.

As indicated by the above examples polymerized rubber (cyclized rubber obtained by reacting the rubber with amphoteric metal halides) has been found to be compatible with melamine-formaldehyde resins wherein the molal ratio of formaldehyde to melamine is at or above about 4:1. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine.

The resins may be alkylated with any of the straight chain or branched chain acyclic alcohols, containing from 3 to 8 carbon atoms. The term "alkylated melamine-formaldehyde resin" is intended to denote compositions which are reacted with an alcohol.

Our products may be plasticized with a wide variety of materials such as the alkyl phthalates, tricresyl phosphate, various alkyd resins, particularly the fatty oil acid modified alkyd resins, etc.

Various fillers, pigments, dyes and lakes may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are for instance phosphoric acid, ammonium salts of phosphoric acid, etc.

Other resinous compositions may be included in various coating compositions, e. g., urea-formaldehyde resins, phenol-formaldehyde resins, ethyl cellulose, cellulose acetate, nitrocellulose, etc.

Polymerized rubber (cyclized rubber obtained by reacting the rubber with amphoteric metal halides) suitable for use in accordance with this invention is prepared by heating crepe rubber in the presence of stannic chloride, ferric chloride, boron fluoride, chlorostannic acid, etc. The production of materials of this type is described in United States Patents Nos. 1,751,817, 1,797,188 and 1,846,247, wherein the use of various metal halides are disclosed. Generically it appears that chlorostannic acid and the halides of amphoteric metals are useful. The term "polymerized rubber" as used in the specification and claims is intended to cover only products prepared in accordance with the foregoing description. The material used in the above examples which is known as "Pliolite" and sold by the Goodyear Tire and Rubber Company, is a thermoplastic amber colored material which softens at 55–65° C. and which has a specific gravity of about 1.05. This composition contains about 95% of rubber hydrocarbons.

Our mixtures of melamine-formaldehyde resins and polymerized rubber, otherwise known as cyclized rubber obtained by reacting the rubber with amphoteric metal halides, are especially suitable for various surface coatings, e. g., metal primers, concrete enamels, acid and alkali resisting compositions, architectural enamels and various interior finishes such as flat wall paints, baking enamels, etc. Our compositions are also suitable in the treatment of paper and textiles, to provide adherent coatings, as well as for crease-proofing processes. One advantage of our mixtures is that thixotropic compositions may readily be produced and this property is especially desirable in wall paints, in printing inks, etc.

Our products have good light resistance, good acid resistance, good alkali resistance, excellent water resistance, good adhesion, excellent abrasive resistance, and they are also resistant to the action of solvent materials. This latter property, together with the reduced thermoplasticity as compared to ordinary polymerized rubber, otherwise known as cyclized rubber obtained by reacting the rubber with amphoteric metal halides, compositions, is primarily brought about by the melamine-formaldehyde resins.

Protective coatings made according to this invention are especially useful in industrial plants where materials are used, not only in painting walls and equipment, but also in coating containers which are used for dilute acids, alkaline solutions, water, salt water, etc.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing substantial amounts of cyclized rubber obtained by reacting the rubber with amphoteric metal halides and a melamine-formaldehyde resin which has been alkylated with an acyclic alcohol containing 3 to 8 carbon atoms, wherein the molal ratio of formaldehyde to melamine is between about 4:1 and about 6:1 and wherein the weight ratio of the cyclized rubber obtained by reacting the rubber with amphoteric metal halides to melamine resin is at least about 3:2.

2. A coating composition containing substantial amounts of cyclized rubber obtained by reacting the rubber with amphoteric metal halides and a melamine-formaldehyde resin which has been alkylated with n-butyl alcohol, wherein the molal ratio of formaldehyde to melamine is between about 4:1 and about 6:1 and wherein the weight ratio of the cyclized rubber obtained by reacting the rubber with amphoteric metal halides to melamine resin is at least about 3:2.

3. A coating composition containing substantial amounts of cyclized rubber obtained by reacting the rubber with amphoteric metal halides and a melamine-formaldehyde resin which has been alkylated with n-hexyl alcohol, wherein the molal ratio of formaldehyde to melamine is between about 4:1 and about 6:1 and wherein the weight ratio of the cyclized rubber obtained by reacting the rubber with amphoteric metal halides to melamine resin is at least about 3:2.

4. A coating composition containing substantial amounts of cyclized rubber obtained by reacting the rubber with amphoteric metal halides and a melamine-formaldehyde resin which has been alkylated with 2-ethyl hexanol, wherein the molal ratio of formaldehyde to melamine is between about 4:1 and about 6:1 and wherein the weight ratio of the cyclized rubber obtained by reacting the rubber with amphoteric metal halides to melamine resin is at least about 3:2.

ROBERT C. SWAIN.
PIERREPONT ADAMS.